(12) United States Patent
Ananthaswamy

(10) Patent No.: US 7,302,025 B2
(45) Date of Patent: Nov. 27, 2007

(54) EFFICIENT JOINT EQUALIZATION/DECODING METHOD AND APPARATUS FOR COMPLEMENTARY-CODE-KEYING BASED SYSTEMS

(75) Inventor: Ganesh Ananthaswamy, North Andover, MA (US)

(73) Assignee: Analog Devices, Inc., Norwood, MA (US)

(*) Notice: Subject to any disclaimer, the term of this patent is extended or adjusted under 35 U.S.C. 154(b) by 713 days.

(21) Appl. No.: 10/817,194

(22) Filed: Apr. 3, 2004

(65) Prior Publication Data

US 2005/0069033 A1 Mar. 31, 2005

Related U.S. Application Data

(60) Provisional application No. 60/505,971, filed on Sep. 25, 2003.

(51) Int. Cl.
*H04B 1/10* (2006.01)
*H04J 11/00* (2006.01)

(52) U.S. Cl. ...................... 375/350; 370/209

(58) Field of Classification Search ............ 375/285, 375/346, 343, 350, 130, 140, 142, 144, 147, 375/148, 150, 316; 370/208, 209; 708/400, 708/410

See application file for complete search history.

(56) References Cited

U.S. PATENT DOCUMENTS

| 5,260,972 | A  | * | 11/1993 | Wang ................... 375/285 |
| 6,233,273 | B1 |   | 5/2001  | Webster et al. |
| 2004/0057532 | A1 |   | 3/2004 | Kim et al. |
| 2004/0091023 | A1 |   | 5/2004 | Chen et al. |

FOREIGN PATENT DOCUMENTS

WO    WO 03/107534 A1 * 12/2003

* cited by examiner

*Primary Examiner*—Tesfaldet Bocure
(74) *Attorney, Agent, or Firm*—Iandiorio & Teska

(57) ABSTRACT

An efficient approach to generating the bias resulting during the joint equalization/decoding of a Complementary-Code-Keying (CCK) based system is provided that includes a bias generator system having a plurality of inputs responsive only to feedback filter coefficients, the bias generator generating, based upon said feedback filter coefficients, a plurality of output signals corresponding to the bias of a Fast Walsh Transform system for cancelling the bias.

19 Claims, 10 Drawing Sheets

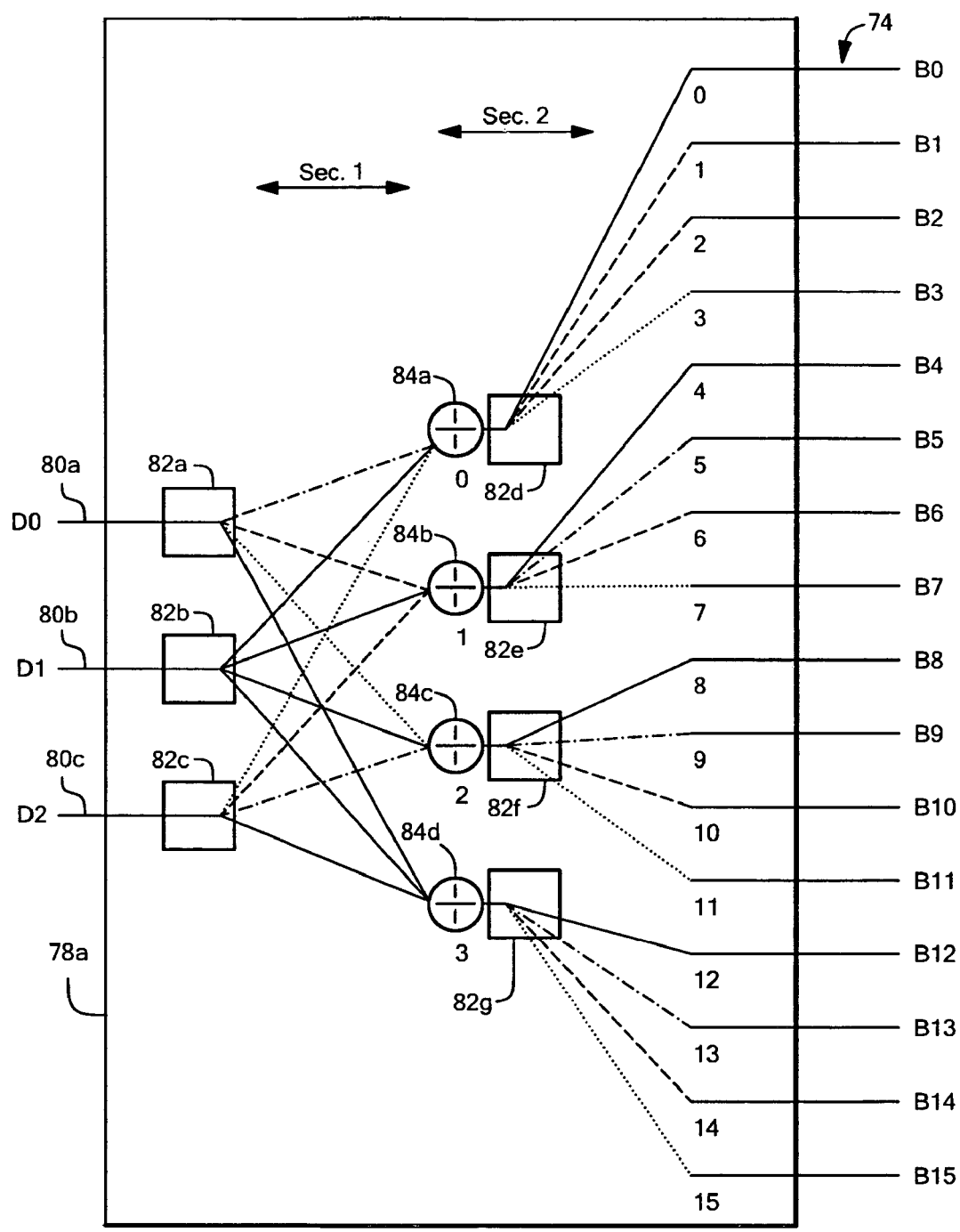
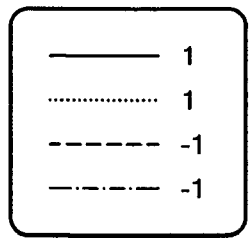
FIG. 7
FIG. 8

EFFICIENT JOINT EQUALIZATION/DECODING METHOD AND APPARATUS FOR COMPLEMENTARY-CODE-KEYING BASED SYSTEMS

RELATED APPLICATIONS

This application claims benefit of a U.S. provisional application filed on Sep. 25, 2003 having Ser. No. 60/505,971 entitled "Efficient Equalization of Complementary-Code-Keying Based Systems".

FIELD OF INVENTION

This invention relates to an efficient approach to generating the bias resulting during the joint equalization/decoding of a Complementary-Code-Keying (CCK) based system.

BACKGROUND OF INVENTION

In wireless systems, the transmitted signal may undergo severe, distortion due to signal dispersion which can be frequency selective. Signal dispersion can occur, for example, when a transmitted wireless signal bounces off the walls in which a cell phone user is located. The received signal will then include signal components from the multiple paths of transmission.

Equalization is a technique generally used to combat frequency-selective fading, a type of distortion that manifests itself as inter-symbol interference (ISI). The distortion caused by ISI falls into two different categories: inter-codeword interference and intra-codeword interference. Inter-codeword interference is the distortion caused on a transmitted codeword due to the presence of other codewords in the transmission stream. Intra-codeword interference is the distortion caused on a transmitted codeword even when no codewords are transmitted prior to or after the codeword. ISI can further be categorized as pre-cursor, cursor and post-cursor ISI which relate to the differing paths of a received wireless signal.

To remove ISI, various equalization techniques are known that have differing complexities and performance. One type of equalizer is decision-feedback equalizer (DFE), which has the appeal of low complexity and good performance. The DFE typically includes a feed-forward filter that suppresses precursor ISI and a feedback filter that suppresses post-cursor ISI. One disadvantage of a DFE is that it requires delay-free decision feedback necessary to operate the DFE. The input to the feedback filter requires a delay-free decision on individual input symbols of the decision device and is thus not very reliable.

U.S. Pat. No. 6,233,273 discloses an equalizer that attempts to eliminate the requirement of delay-free feedback at the input to the feedback filter of the DFE. One approach disclosed in the '273 patent is to use multiple feedback paths upstream of the correlator: one feedback path corresponding to each possible codeword, in which each of the codewords is input into its own feedback path. To determine the actual transmitted codeword, a correlation is performed on each of the multiple DFE outputs with respect to the corresponding codeword and the output that has the highest correlation is chosen. The equalizer of the '273 patent, however, has considerable complexity due to its multiple feedback paths and corresponding multipath correlations that need to be performed to determine the actually transmitted codeword.

Another approach of the '273 patent is to use multiple feedback paths downstream of a codeword correlator. A Fast Walsh Transform system is implemented as a codeword correlator for the received signal. Typically, however, the output signals of the Fast Walsh Transform system include an undesired bias when only partial equalization has been performed upstream of the Fast Walsh Transform. The '273 patent discloses an attempt to remove this bias by sending the outputs of the Fast Walsh Transform system to an expander which expands the number of outputs such that each of the outputs can have subtracted from it one of a plurality of correlated signals, one for each possible codeword. A peak detector then determines which of these outputs is the actual transmitted signal. As with the upstream correlation method described above, this method also has considerable complexity due to the multiple feedback paths and the corresponding multipath correlation that needs to be performed for each of the possible codewords.

BRIEF SUMMARY OF THE INVENTION

It is therefore an object of this invention to provide improved Fast Walsh Transform bias cancellation system.

It is a further object of this invention to provide such a Fast Walsh Transform bias cancellation system that does not require a separate feedback loop for each of all possible codewords.

The invention results from the realization that the bias output from Fast Walsh Transform is more effectively cancelled by the inclusion of a bias generator system having a plurality of inputs responsive only to feedback filter coefficients $f_1$, $f_3$, $f_7$ and $f_9$, in which the bias generator generates, based upon said feedback filter coefficients, a plurality of output signals corresponding to the bias of a Fast Walsh Transform system for cancelling the bias.

The invention features a Fast Walsh Transform bias cancellation system with a bias generator system having a plurality of inputs responsive only to feedback filter coefficients $f_1$, $f_3$, $f_5$, and $f_7$. The bias generator generates, based upon the feedback filter coefficients, a plurality of output signals corresponding to the bias of a Fast Walsh Transform system for cancelling the bias.

In one preferred embodiment, the Fast Walsh Transform bias cancellation system may further include a feedback filter coefficient generator for generating feedback filter coefficients from the received codewords. The bias generator may have a plurality of outputs each having a signal thereon, the bias generator output signals being defined by the equation:

$$B_k = (-f_1\Phi_2 + f_3\Phi_2^*)a_{0,\lfloor k/4 \rfloor}b^*_{\lfloor k/4 \rfloor,k} +$$
$$(2f_3\Phi_2 + 2f_5\Phi_2^*)b^*_{\lfloor k/4 \rfloor,k} + (-f_5\Phi_2 + f_7\Phi_2^*)a^*_{0,\lfloor k/4 \rfloor}b^*_{\lfloor k/4 \rfloor,k}$$

The invention also features a Fast Walsh Transform bias cancellation system that includes a bias coefficient generator responsive to feedback filter coefficients and having a plurality of outputs, the bias coefficient generator configured to calculate bias generator inputs; and a bias generator responsive to the bias coefficient generator outputs and having signals on its outputs corresponding to the bias of a Fast Walsh Transform system, the bias generator including: a plurality of adders each having an input and an output coupled to one of the bias generator outputs; and a plurality of complex multipliers each coupled between each adder input and each bias coefficient generator output.

In one example, the bias coefficient generator may have three outputs each having a signal thereon, the generator output signals being defined by the respective equations:

$$D_0 = -f_1\Phi_2 + f_3\Phi_2^*,\ D_1 = 2f_3\Phi_2 + 2f_5\Phi_2^*,\ \text{and}\ D_2 = -f_5\Phi_2 + f_7\Phi_2^*.$$

The outputs of the bias generator may have sixteen outputs each having a signal thereon, the bias generator output signals being defined by the equation: $B_k = D_0 a_{0,\lfloor k/4 \rfloor} b^*_{\lfloor k/4 \rfloor,k} + D_1 b^*_{\lfloor k/4 \rfloor,k} + D_2 a^*_{0,\lfloor k/4 \rfloor} b^*_{\lfloor k/4 \rfloor,k}$. The first set of complex multipliers may include three complex multipliers, the plurality of adders may include eight adders, the second set of complex multipliers may include sixteen complex multipliers and the bias generator may include sixteen outputs. The bias coefficient generator may be responsive to the feedback filter coefficients consisting of $f_1$, $f_3$, $f_5$, and $f_7$. The bias coefficient generator may further be responsive to a Fast Walsh Transform parameter that indicates the quadriphase rotation. The Fast Walsh Transform bias cancellation system may further include the Fast Walsh Transform system.

This invention also features a Fast Walsh Transform bias cancellation system that includes a bias coefficient generator responsive to feedback filter coefficients, the bias coefficient generator having a plurality of outputs and configured to calculate bias generator inputs; and a bias generator responsive to the bias coefficient generator outputs and having a plurality of outputs, the signals on the bias generator outputs corresponding to the bias of the Fast Walsh Transform system, the bias generator including: a first set of complex multipliers, one coupled to each bias generator input and responsive thereto, each of the first set of complex multipliers having a complex output; a plurality of adders each having an output and responsive to the complex outputs of the first set of complex multipliers; and a second set of complex multipliers, one coupled to each adder output and responsive thereto, and having outputs for providing the bias generator outputs.

In a preferred embodiment of the Fast Walsh Transform bias cancellation system, the bias coefficient generator may have three outputs each having a signal thereon, the generator output signals being defined by the respective equations: $D_0 = -f_1 \Phi_2 + f_3 \Phi^*_2$, $D_1 = 2f_3 \Phi_2 + 2f_5 \Phi^*_2$, and $D_2 = -f_5 \Phi_2 + f_7 \Phi^*_2$. The outputs of the bias generator may have sixteen outputs each having a signal thereon, the bias generator output signals being defined by the equation: $B_k = D_0 a_{0,\lfloor k/4 \rfloor} b^*_{\lfloor k/4 \rfloor,k} + D_1 b^*_{\lfloor k/4 \rfloor,k} + D_2 a^*_{0,\lfloor k/4 \rfloor} b^*_{\lfloor k/4 \rfloor,k}$. The first set of complex multipliers may include three complex multipliers, the plurality of adders may include eight adders, the second set of complex multipliers may include sixteen complex multipliers and the bias generator may include sixteen outputs. The bias coefficient generator may be responsive to the feedback filter coefficients consisting of $f_1$, $f_3$, $f_5$, and $f_7$. The bias coefficient generator may be further responsive to a Fast Walsh Transform parameter ø2 selected from the group of 1, −1, j, −j. The Fast Walsh Transform bias cancellation system may further include the Fast Walsh Transform system.

The invention also features a Fast Walsh Transform bias cancellation system that includes a Fast Walsh Transform system having a plurality of outputs; means for generating the bias of a Fast Walsh Transform system; means for cancelling the bias of the Fast Walsh Transform system responsive to the Fast Walsh Transform system outputs and the means for generating the bias of a Fast Walsh Transform system.

BRIEF DESCRIPTION OF THE DRAWINGS

Other objects, features and advantages will occur to those skilled in the art from the following description of a preferred embodiment and the accompanying drawings, in which:

FIG. 7 is a more detailed schematic block diagram of the bias generator of FIG. 6;

PREFERRED EMBODIMENT

Figure 1:
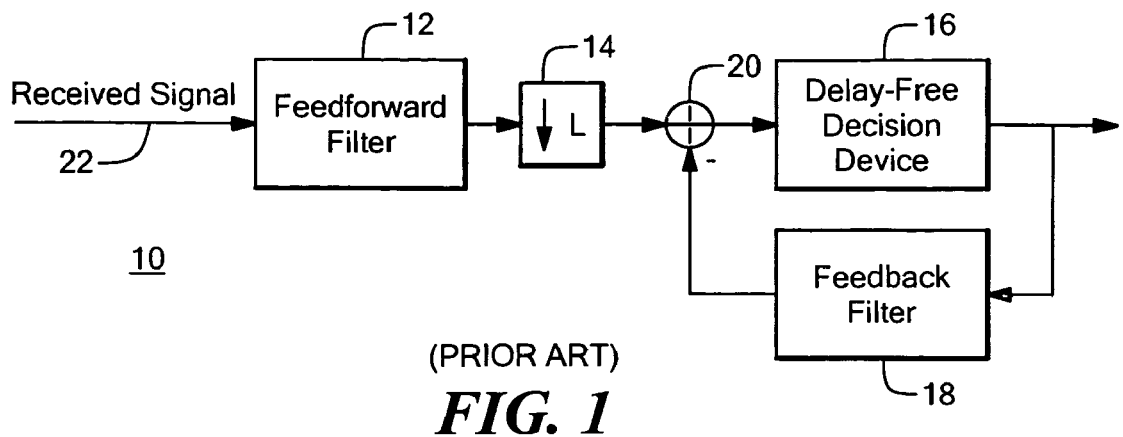
FIG. 1 is a schematic block diagram showing the primary components of a prior decision-feedback equalizer (DFE)

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 a prior decision-feedback equalizer (DFE) 10 that includes a feedforward filter 12, a downsampler 14, a delay-free decision device 16, a feedback filter 18, and an adder 20. Feedforward filter 12 suppresses precursor inter-symbol interference (ISI) and operates at L times the baud rate of the received signal 22. The output of feedforward filter 12 is coupled to an input of downsampler 14 to downsample the output of filter 12 by the factor of L. The output of downsampler 14 is applied to an input of adder 20 which also subtracts at another of its input an output of feedback filter 18. The output of adder 20 is coupled to an input of delay-free decision device 16. The output of decision device 16 is the output of DFE 10 and is also fed back to an input of feedback filter 18. Feedback filter 18 suppresses post-cursor ISI.

One disadvantage of DFE 10 is that decision device 16 must make a delay-free decision on what codeword was received on line 22. Any delay in making a decision at device 16 will be incompatible with the delay-free decision feedback necessary to operate DFE 10.

Figure 2:
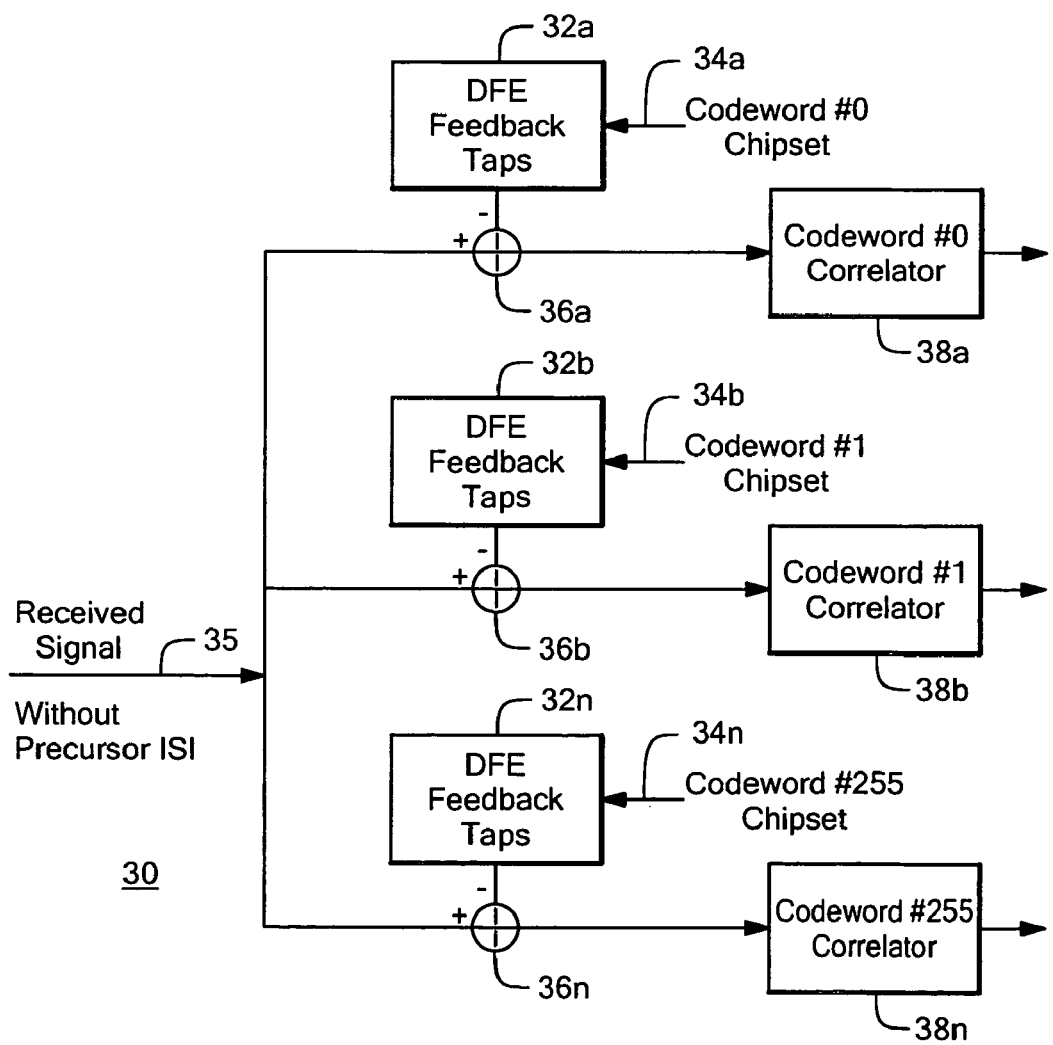
FIG. 2 is a schematic block diagram of a prior DFE using feedback upstream of a correlator.

Another prior DFE 30, FIG. 2, attempts to eliminate the requirement for delay-free feedback by using a plurality of DFE feedback taps 32a, 32b . . . 32n. The input of each feedback tap 32a-32n has a corresponding input 34a, 34b . . . 34n each of which have transmitted on them one of the possible codewords that can be transmitted. For DFE 30, it is required to have a separate feedback tap 32a-32n for each possible codeword that can be transmitted. For example, if there are 256 codewords that could be transmitted, DFE 30 would require 256 feedback loops. The output of each feedback tap 32a-32n is input into a corresponding adder 36a, 36b . . . 36n, each of which also has the received signal 35 (with precursor ISI suppressed) as an input. The output of each adder 36a-36n is input into a corresponding correlator 38a, 38b . . . 38n. To determine which codeword was actually transmitted, the outputs of correlators 38a-38n are compared to determine which of the codewords on 34a-34n has the highest correlation with the received signal on line 35. The disadvantage of DFE 30, as noted above in the background of the invention section above, is that it has considerable complexity due to the requirement for multiple feedback taps, one for each possible codeword that may be transmitted.

Figure 3:
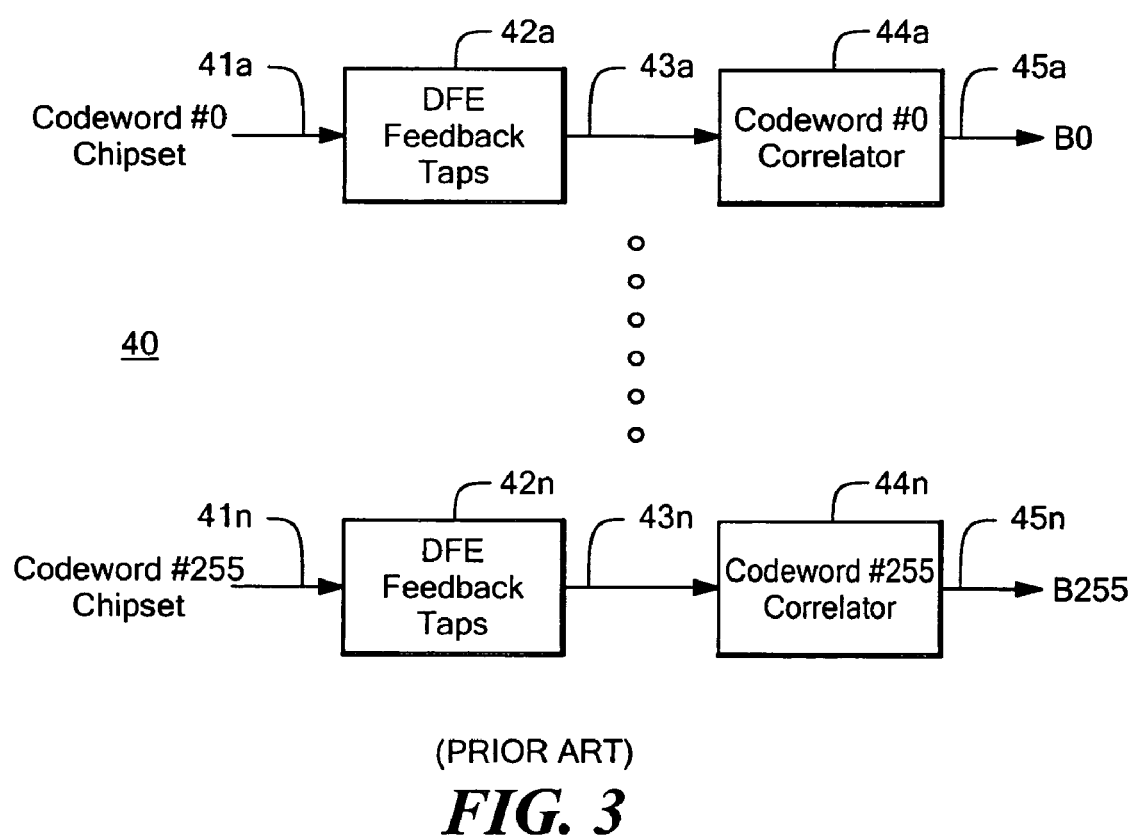
FIG. 3 is a schematic block diagram of a prior DFE using feedback downstream of a correlator.

Another prior DFE 40, FIG. 3, generates an estimate of the bias B0-B255 at the output of the Fast Walsh Transform by passing all the possible codewords on lines 41a-41n through a multiplicity of feedback filters 42a-42n to produce the corresponding outputs 43a-43n. These outputs 43a-43n are then passed through the corresponding codeword correlators 44a-44n to produce the bias estimate on lines 45a-45n. Similar to DFE 30 of FIG. 2, a distinct disadvantage of using DFE 40, FIG. 3, is that a separate feedback tap and corresponding feedback loop is required for each possible codeword that may be transmitted which adds considerable complexity to the circuitry of DFEs 30 and 40.

Figure 4:
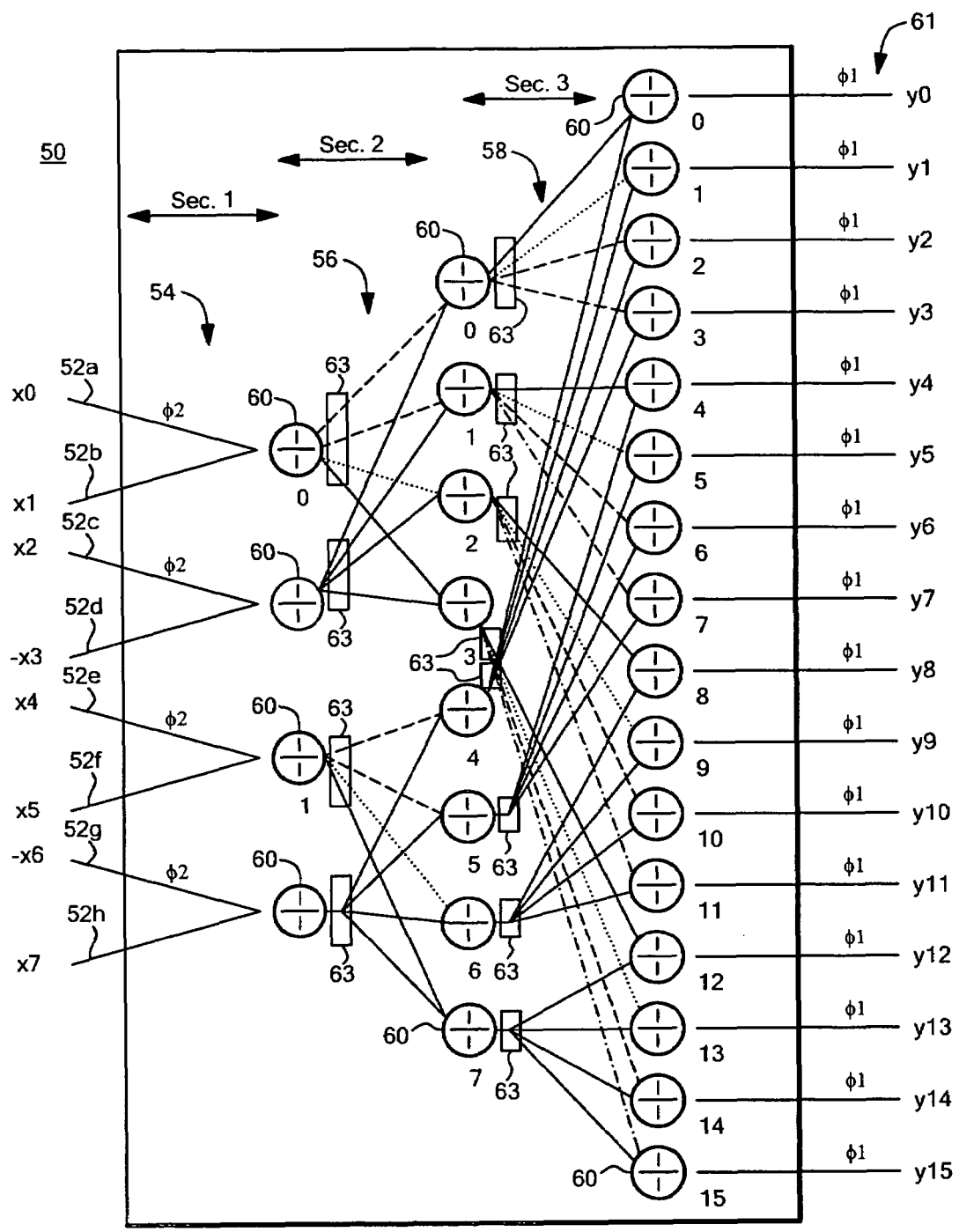
FIG. 4 is a schematic block diagram of a prior art Fast Walsh Transform system.
Figure 4:
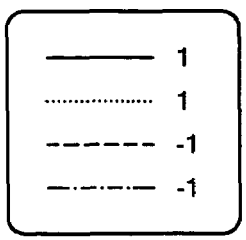

A typical modified Fast Walsh Transform (FWT), FIG. 4, includes eight inputs 52a-52h, which are modified by three transfer functions 54, 56 and 58. A plurality of adders 60 are located after each transfer function 54, 56 and 58. The output of FWT 50 has 16 outputs 61 denoted as $y_o$-$y_{15}$. With the exception of adders 60 coupled to the output of FWT 50, adders 60 each have their output coupled to an input of a complex multiplier 63, which may multiply an input signal by the complex quantity of 1, −1, j or −j. As can be seen in FIG. 4, a solid line in one of the transfer functions denotes multiplying a signal by the real number 1, a dotted line denotes multiplying the signal by imaginary number j, a dashed line denotes multiplying a signal by −1, and a line including dashes and dots denotes multiplying the signal by −j. The outputs of FWT 50 can be described by the equation:

$$y_k = [(x_0\Phi_2 + x_1)a_{0,\lfloor k/4 \rfloor} + (x_2\Phi_2 - x_3)]b_{\lfloor k/4 \rfloor,k}\Phi_1 + [(x_4\Phi_2 + x_5)a_{1,\lfloor k/4 \rfloor+4} + (-x_6\Phi_2 + x_7)]b_{\lfloor k/4 \rfloor+4,k}\Phi_1 \quad (1)$$

wherein:

{$a_{0,k}$: k=0:3} is the scaling factor of transfer function 56 from node 0 to node k in section 2 of FIG. 4;

{$a_{1,k}$: k=4:7} is the scaling factor of transfer function 56 from node 1 to node k in section 2 of FIG. 4;

{$b_{k,1}$: k=0:7, l=0:15} is the scaling factor of transfer function 58 from node k to node l in section 3 of FIG. 4;

$\Phi_2$ and $\Phi_1$ denote the quadriphase rotation of FWT 50 and which both may include the value of either 1, −1, j, −j; and $\lfloor \ \rfloor$ are floor operators that are replaced by the largest integer less than the quantity specified between the floor operator (for example, $\lfloor 9/4 \rfloor$=2).

By definition, $$a_{1,\lfloor k/4 \rfloor+4} = a_{0,\lfloor k/4 \rfloor} \quad (2)$$

$$b_{\lfloor k/4 \rfloor+4,k} = 1 \quad (3)$$

Therefore, $$y_k = (\Phi_1\Phi_2 a_{0,\lfloor k/4 \rfloor}b_{\lfloor k/4 \rfloor,k})x_0 + (\Phi_1 a_{0,\lfloor k/4 \rfloor}b_{\lfloor k/4 \rfloor,k})x_1 + \quad (4)$$
$$(\Phi_1\Phi_2 b_{\lfloor k/4 \rfloor,k})x_2 + (-\Phi_1 b_{\lfloor k/4 \rfloor,k})x_3 + (\Phi_1\Phi_2 a_{0,\lfloor k/4 \rfloor})x_4 +$$
$$(\Phi_1 a_{0,\lfloor k/4 \rfloor})x_5 + (-\Phi_1\Phi_2)x_6 + (\Phi_1)x_7$$

$$= \sum_{l=0}^{7} A_l(k)x_l \quad (5)$$

where, $A_0(k) = \Phi_1\Phi_2 a_{0,\lfloor k/4 \rfloor}b_{\lfloor k/4 \rfloor,k}$
$A_1(k) = \Phi_1 a_{0,\lfloor k/4 \rfloor}b_{\lfloor k/4 \rfloor,k}$
$A_2(k) = \Phi_1\Phi_2 b_{\lfloor k/4 \rfloor,k}$
$A_3(k) = -\Phi_1 b_{\lfloor k/4 \rfloor,k}$
$A_4(k) = \Phi_1\Phi_2 a_{0,\lfloor k/4 \rfloor}$
$A_5(k) = \Phi_1 a_{0,\lfloor k/4 \rfloor}$
$A_6(k) = -\Phi_1\Phi_2$
$A_7(k) = \Phi_1$ From equation 5, the codeword corresponding to the $k^{th}$ output of the correlator is given by [$A^*_0(k) A^*_1(k) \ldots A^*_7(k)$], where * denotes complex conjugation.

Typically, FWT 50 is an efficient correlator structure for signals, such as complementary-code keying (CCK) signals. However, the outputs $y_o$-$y_{15}$ of FWT 50 typically include a bias. As noted in the background of the invention section above, prior systems have attempted to remove this bias, but require complex circuitry to do so.

Figure 5:
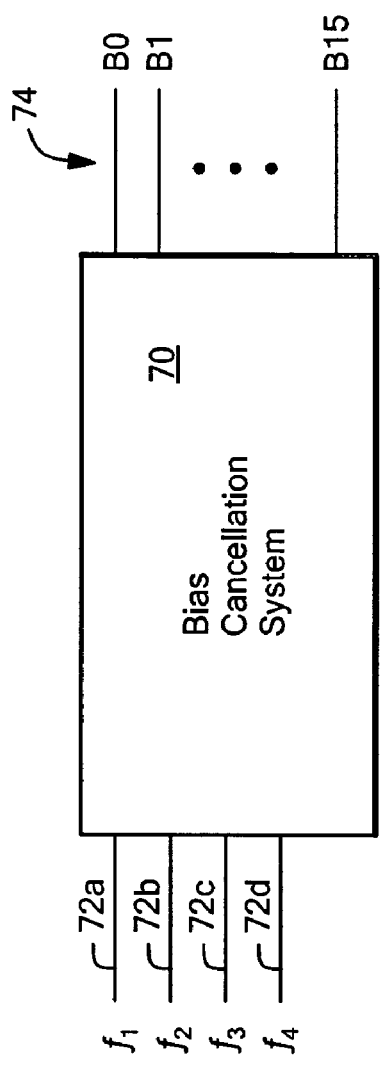
FIG. 5 is a schematic block diagram showing the primary components of a Fast Walsh Transform bias cancellation system in accordance with the subject invention.

A bias cancellation system 70, FIG. 5, in accordance with the subject invention includes a plurality of inputs 72a-72d and a plurality of outputs 74. For example, output 74 of bias generator system can include 16 outputs having signals $B_0$, $B_1 \ldots B_{15}$ thereon. Inputs 72a-72d are responsive to feedback filter coefficients. In particular, due to the efficiency of bias generator system 70, it need only be responsive to feedback filter coefficients $f_1$, $f_3$, $f_5$ and $f_7$. Bias cancellation system 70 calculates the bias $B_k$ of modified FWT 50 by using the equations 6 or 7 described below.

$$B_k = (-f_1\Phi_2 + f_3\Phi^*_2)a_{0,\lfloor k/4 \rfloor}b^*_{\lfloor k/4 \rfloor,k} + \quad (6)$$
$$(2f_3\Phi_2 + 2f_5\Phi^*_2)b^*_{\lfloor k/4 \rfloor,k} +$$
$$(-f_5\Phi_2 + f_7\Phi^*_2)a^*_{0,\lfloor k/4 \rfloor}b^*_{\lfloor k/4 \rfloor,k}$$

$$= D_0 a_{0,\lfloor k/4 \rfloor}b^*_{\lfloor k/4 \rfloor,k} + D_1 b^*_{\lfloor k/4 \rfloor,k} + D_2 a^*_{0,\lfloor k/4 \rfloor}b^*_{\lfloor k/4 \rfloor,k} \quad (7)$$

where, $D_0 = -f_1\Phi_2 + f_3\Phi^*_2$ $D_1 = 2f_3\Phi_2 + 2f_5\Phi^*_2$ $D_2 = -f_5\Phi_2 + f_7\Phi^*_2 \quad (8)$ The above equations are derived from an understanding that to eliminate intra-codeword interference from the input to the correlator, the desired output $y_k^{desired}$ is given by:

$$y_k^{desired} = \sum_{j=0}^{7}\left(x_j - \sum_{l=1}^{j} f_l A^*_{j-l}(k)\right)A_j(k) \quad (9)$$

$$= \sum_{j=0}^{7} A_j(k)x_j - B_k \quad (10)$$

where, $$B_k = \sum_{j=0}^{7}\left(\sum_{l=1}^{j} f_l A^*_{j-l}(k)\right)A_j(k) \quad (11)$$

Further simplification of equation 11 can be made to obtain equation 7 by using the following equalities:

$$|a_{0,\lfloor k/4 \rfloor}|^2 = |b_{\lfloor k/4 \rfloor,k}|^2 = |\Phi_1|^2 = |\Phi_2|^2 = 1 \quad (12)$$

Feedback filter coefficients $f_1$, $f_3$, $f_5$, and $f_7$, 72a-72d, are preferably available at the time of computing the correlation.

Methods for calculating feedback filter coefficients $f_1$, $f_3$, $f_5$ and $f_7$ are known to those skilled in the art and are described in the publications E. A. LEE & D. G. MESSERSCHMITT, DIGITAL COMMUNICATION (2nd ed. 1994) and S. HAYKIN, ADAPTIVE FILTER THEORY (4th ed. 2002).

Figure 6:
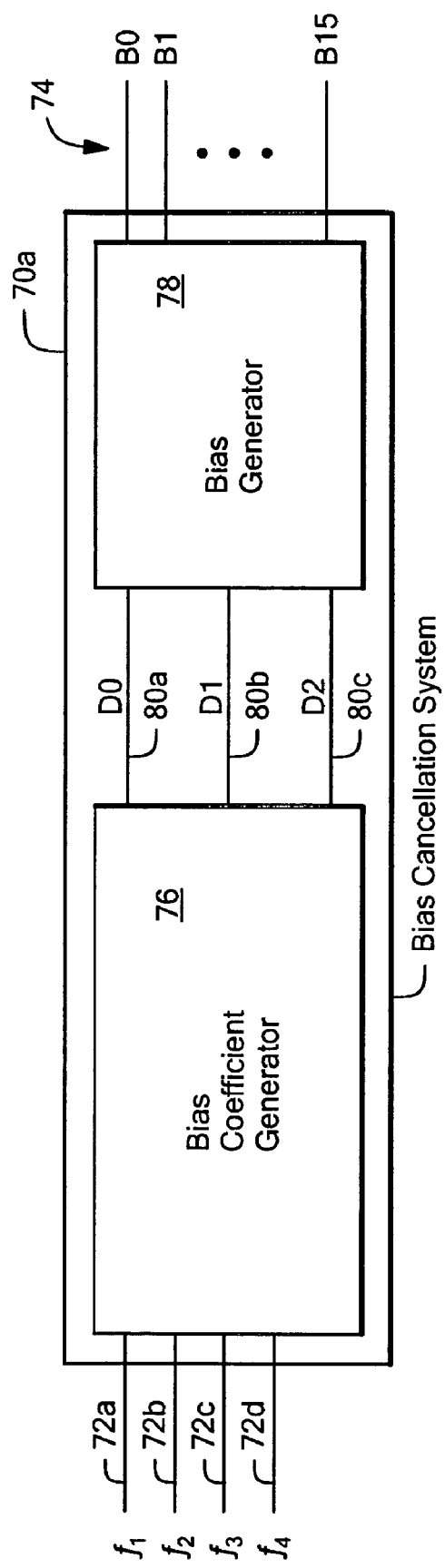
FIG. 6 is a more detailed schematic block diagram of the bias generator system of FIG. 5 including a bias coefficient generator and a bias generator.

In the implementation of equations 7 and 8 above, bias cancellation system 70a, FIG. 6, can be divided into a bias coefficient generator 76 and a bias generator 78. Bias coefficient generator 76 generates three outputs, 80a, 80b and 80c that have signals $D_0$, $D_1$ and $D_2$ thereon. Bias generator 78 calculates the bias of FWT 50 based upon input signals $D_0$, $D_1$ and $D_2$. Bias generators 70 and 70a are both a means for generating the bias of FWT 50.

An exemplary bias generator 78a, FIG. 7, includes a plurality of complex multipliers 82a-82g and a plurality of adders 84a-84d. Complex multipliers 82a-82c are responsive to input signals 80a-80c, respectively. The outputs of complex multipliers 82a-82c are coupled to the input of adders 84a-84d. The output of adders 84a-84d are respectively coupled to the input of complex multipliers 82d-82g. The outputs of complex multipliers 82d-82g are coupled to the outputs 74 of biased generator 78a. Bias generator 78a provides outputs that correspond to equation 7 in response to inputs 80a-80c.

Figure 8A:
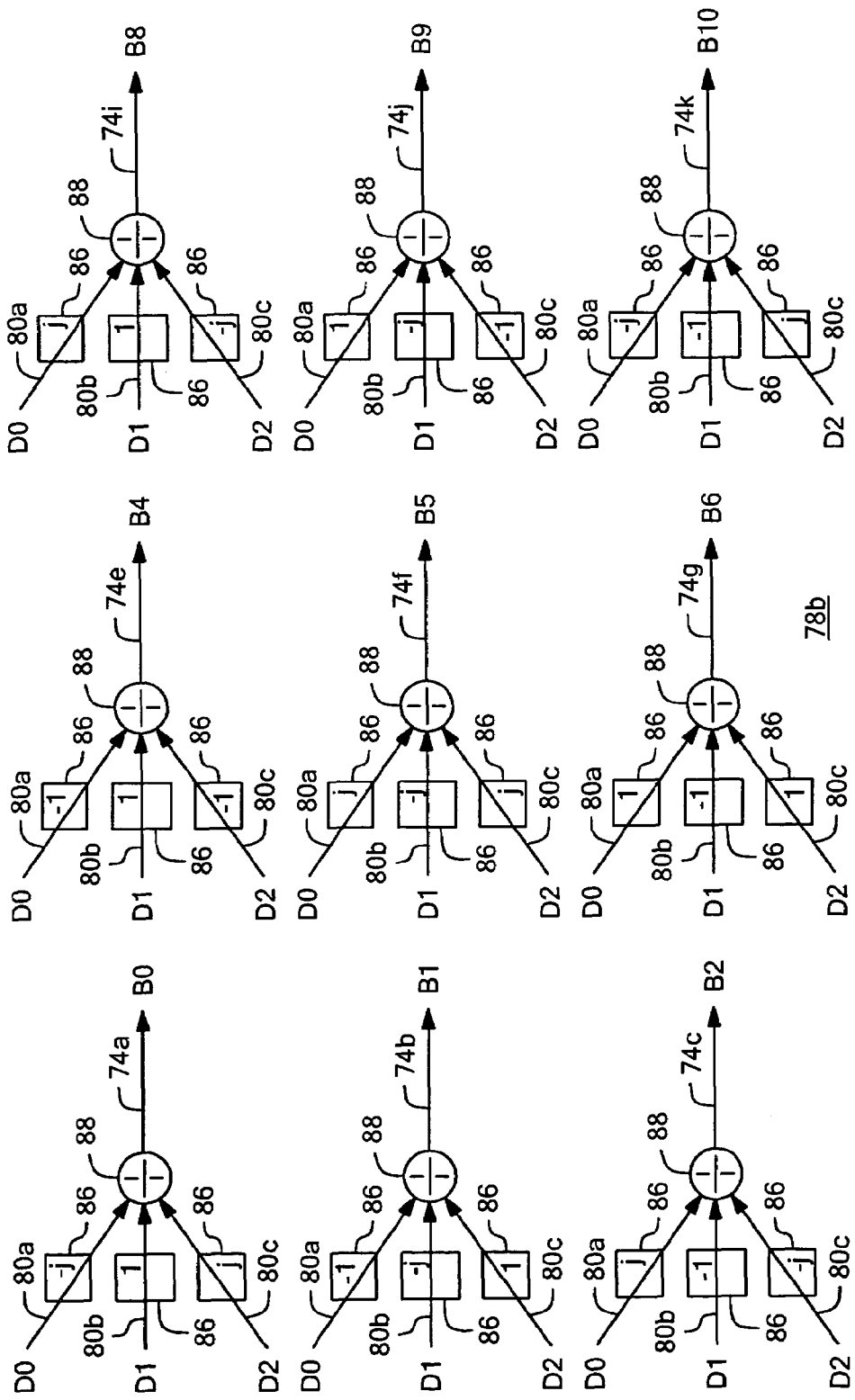
FIG. 8 is a more detailed schematic block diagram of another embodiment of the bias generator of FIG. 6.
Figure 8B:
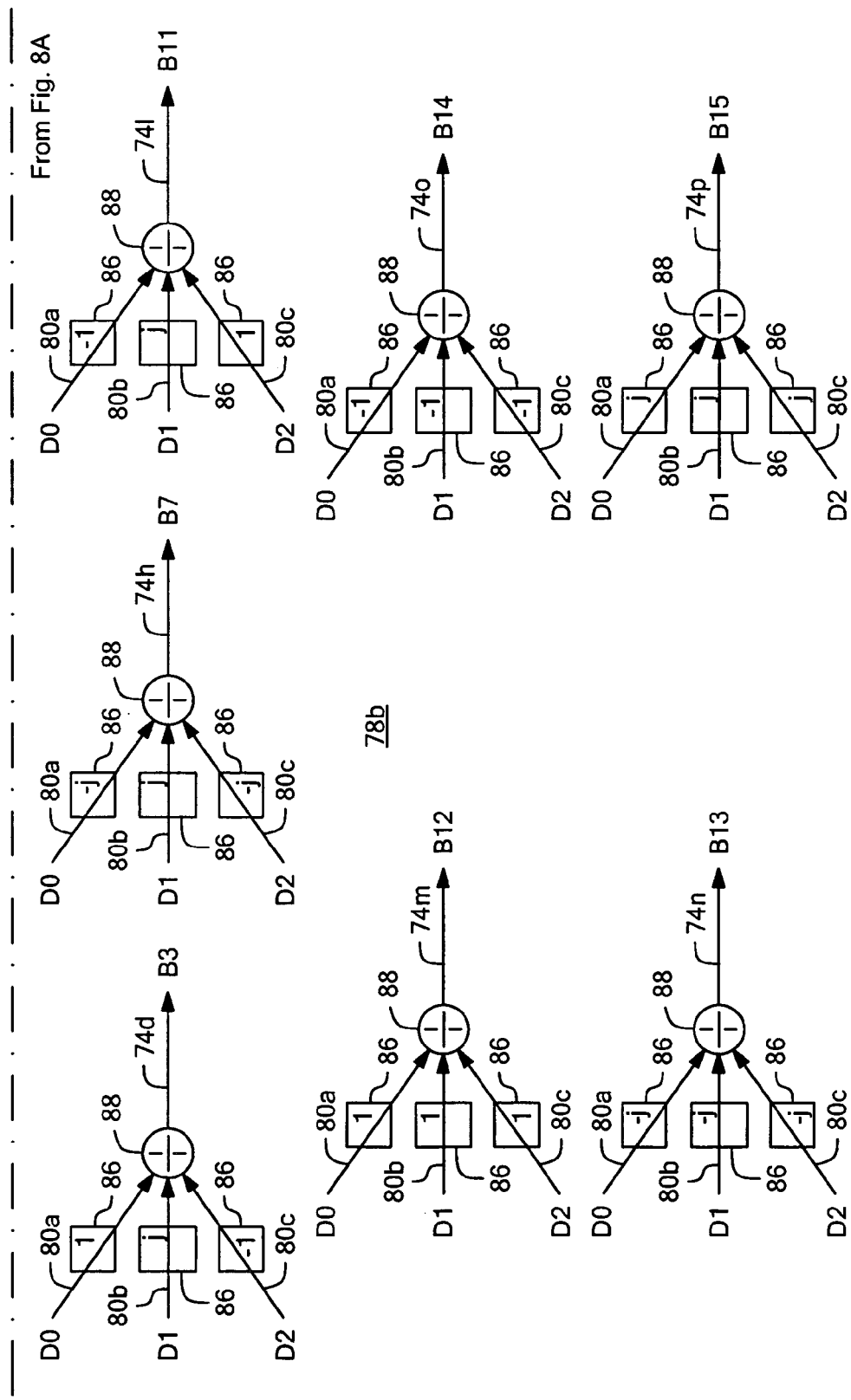

An alternate embodiment of biased generator 78b, FIG. 8, includes a plurality of complex multipliers 86, each responsive to one of the input signals 80a, 80b, or 80c and having an output coupled to an adder 88. Each adder 88 has an output coupled to one of the outputs 74a-74p of bias generator 78b. Each complex multiplier 86 in FIG. 78d shows the complex notation of either 1, −1, j, or −j, which denotes by what complex quantity the complex multiplier multiplies the corresponding input signal 80a, 80b, or 80c.

Figures 9, 9A:
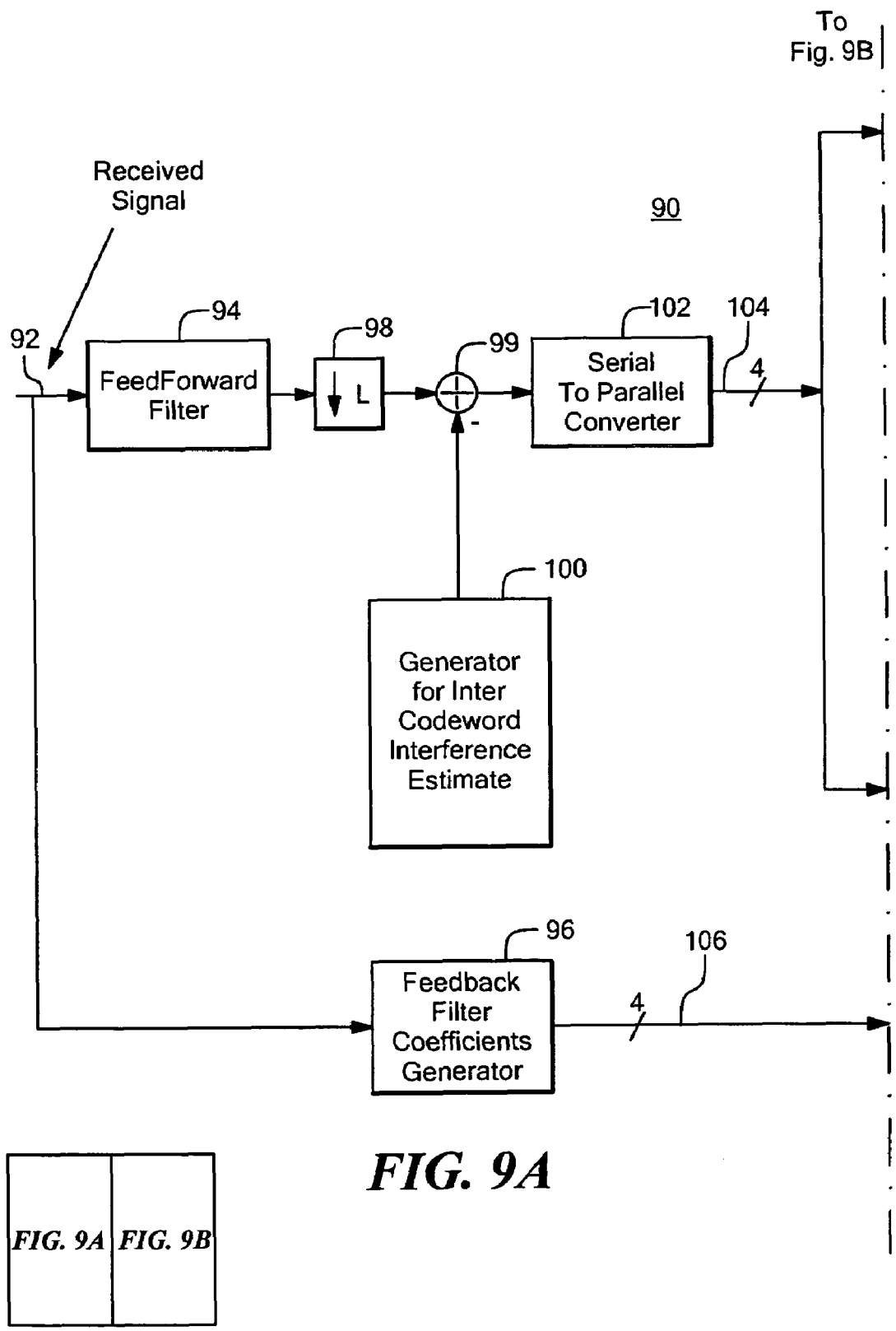
FIG. 9 is a schematic block diagram of a receiver system that includes the Fast Walsh Transform bias cancellation system of FIG. 5.
Figure 9B:
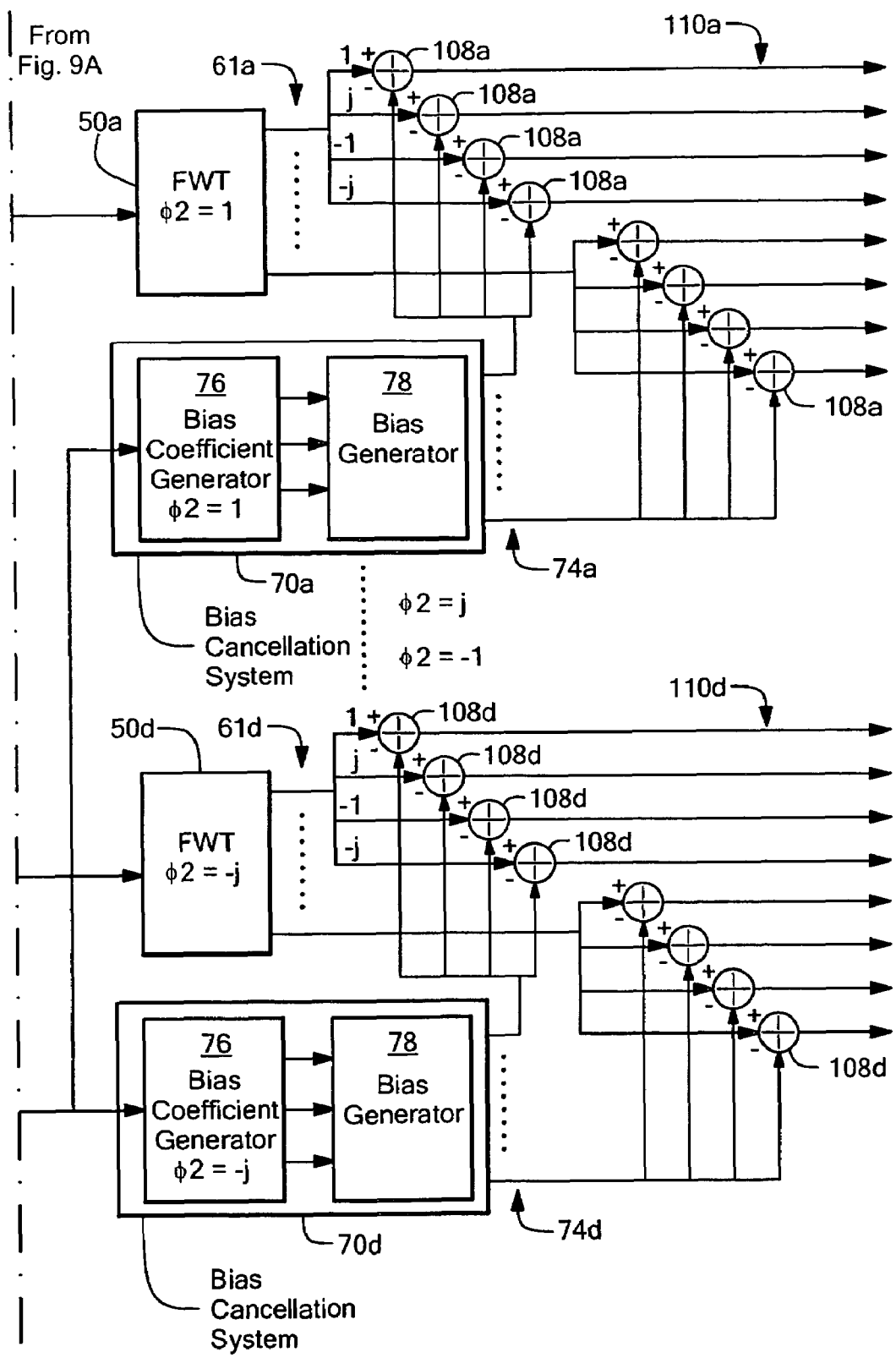

Receiver system 90, FIG. 9, includes four bias cancellation systems 70a-70d and four Fast Walsh Transforms 50a-50d. Receiver system 90 is responsive to a received signal on line 92 which is input to feed forward filter 94 and feedback filter coefficients generator 96. The output of feed forward filter 94 is coupled to an input of downsampler 98, which has an output coupled to the input of adder 99. Adder 99 has a second input which subtracts the output of generator 100 that generates an inter-codeword interference estimate. The output of adder 99 is input into serial-to-parallel converter 102. Serial-to-Parallel converter 102 provides an output vector 104 that is coupled to the inputs of each of the four Fast Walsh Transforms 50a-50d. Feedback filter coefficients generator 96 has four outputs 106, each of which coupled to one of the inputs of biased generator system 70a-70d.

The four sets of sixteen outputs 61a-61d are further multiplied by 1, −1, j and −j as shown in FIG. 9 before being input to adder 108a which also subtracts the corresponding outputs 74a of bias cancellation system 70a. Adder 108a is one possible means for cancelling the bias from FWT 50a by subtracting the outputs 74a of bias cancellation system 70a from outputs 61 of FWT 50a. The same is done for outputs 61b-61d and outputs 74b-74d. The outputs 110a of adders 108a are input into a peak detector (not shown) that determines which of the signals on lines 110a, 110b, 110c or 110d have the highest correlation which indicates the actually transmitted codeword.

Figure 10:
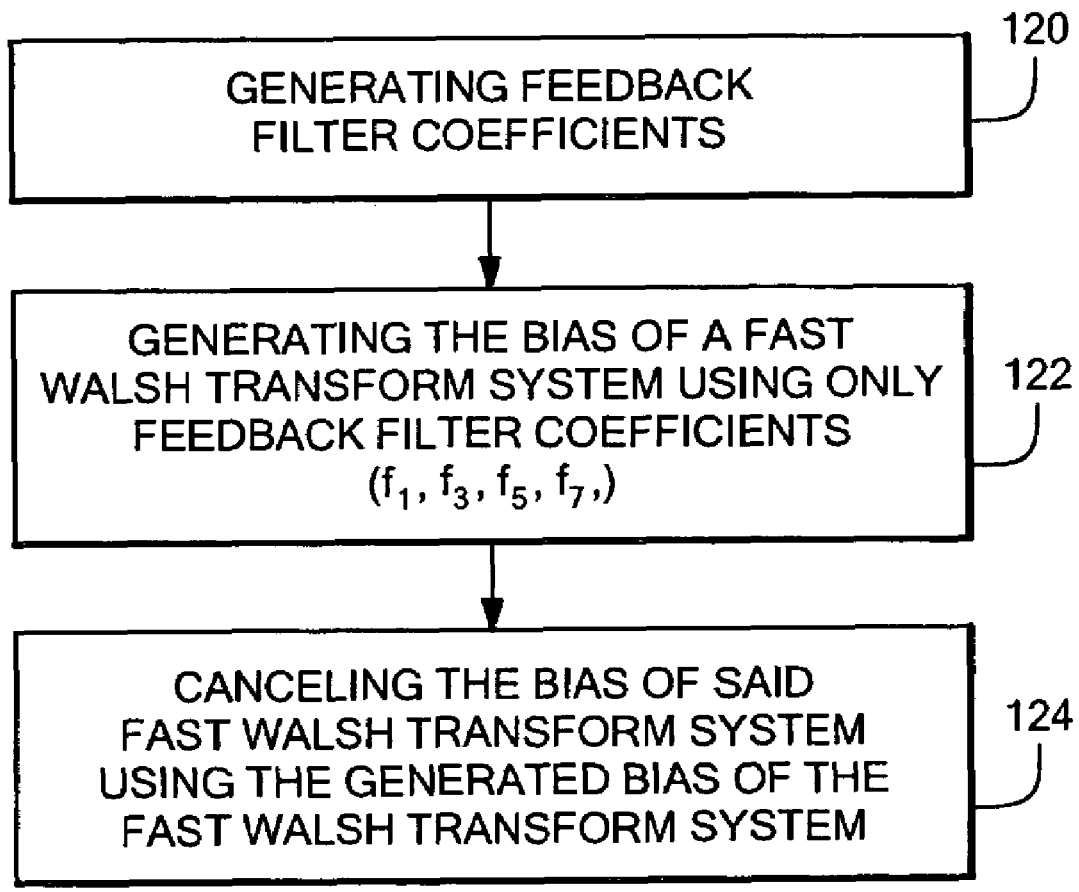
FIG. 10 is a flowchart of a method for cancelling the bias of a Fast Walsh Transform system.

A method for cancelling the bias of a FWT, FIG. 10, begins at step 120 with generating feedback filter coefficients. At step 122, the bias of a FWT is generated using only the feedback filter coefficients generated at 120. In particular, feedback filter coefficients $f_1$, $f_3$, $f_5$ and $f_7$ may be the only coefficients necessary to use to generate the FWT bias. Bias cancellation system 70, FIG. 5, or 70a, FIG. 6, can be used to generate the FWT bias. At 124, the bias of the FWT is cancelled using the bias generated at step 122. A system of adders 108, FIG. 9, can be used to cancel the FWT bias using the bias generated at step 122, FIG. 10, as an input.

One advantage of the subject invention is that it can be used to cancel the bias of a Fast Walsh Transform system without requiring the use of a separate feedback loop for each of all possible codewords that can be transmitted.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A Fast Walsh Transform bias cancellation system, comprising:
   a bias generator system having a plurality of inputs responsive only to feedback filter coefficients $f_1$, $f_3$, $f_5$ and $f_7$, said bias generator generating, based upon said feedback filter coefficients, a plurality of output signals corresponding to the bias from a Fast Walsh Transform system for cancelling said bias.

2. The Fast Walsh Transform bias cancellation system of claim 1, further including a feedback filter coefficient generator for generating said feedback filter coefficients.

3. The Fast Walsh Transform bias cancellation system of claim 1, in which the bias generator has a plurality of outputs each having a signal thereon, the bias generator output signals being defined by the equation:

$$B_k = (-f_1\Phi_2 + f_3\Phi_2^*)a_{0,\lfloor k/4 \rfloor}b_{\lfloor k/4 \rfloor,k}^* +$$
$$(2f_3\Phi_2 + 2f_5\Phi_2^*)b_{\lfloor k/4 \rfloor,k}^* +$$
$$(-f_5\Phi_2 + f_7\Phi_2^*)a_{0,\lfloor k/4 \rfloor}^*b_{\lfloor k/4 \rfloor,k}^*.$$

4. A Fast Walsh Transform bias cancellation system, comprising:
   a bias coefficient generator responsive to feedback filter coefficients and having a plurality of outputs, said bias coefficient generator configured to calculate bias generator inputs; and
   a bias generator responsive to the bias coefficient generator outputs and having signals on its outputs corresponding to the bias from a Fast Walsh Transform system, said bias generator including:
      a plurality of adders each having an input and an output coupled to one of the bias generator outputs; and
      a plurality of complex multipliers each coupled between each adder input and each bias coefficient generator output.

5. The Fast Walsh Transform bias cancellation system of claim 4, in which the bias coefficient generator has three outputs each having a signal thereon, the generator output signals being defined by the respective equations:

$$D_0 = -f_1\Phi_2 + f_3\Phi_2^*$$
$$D_1 = 2f_3\Phi_2 + 2f_5\Phi_2^*$$
$$D_2 = -f_5\Phi_2 + f_7\Phi_2^*.$$

6. The Fast Walsh Transform bias cancellation system of claim 5, in which the bias generator has sixteen outputs each having a signal thereon, the bias generator output signals being defined by the equation:

$$B_k = D_0 a_{0,\lfloor k/4 \rfloor} b^*_{\lfloor k/4 \rfloor, k} + D_1 b^*_{\lfloor k/4 \rfloor, k} + D_2 a^*_{0,\lfloor k/4 \rfloor} b^*_{\lfloor k/4 \rfloor, k}.$$

7. The Fast Walsh Transform bias cancellation system of claim 4, in which the first set of complex multipliers includes three complex multipliers, the plurality of adders includes eight adders, the second set of complex multipliers includes sixteen complex multipliers and the bias generator includes sixteen outputs.

8. The Fast Walsh Transform bias cancellation system of claim 4, in which the bias coefficient generator is responsive to the feedback filter coefficients consisting of $f_1$, $f_3$, $f_5$, and $f_7$.

9. The Fast Walsh Transform bias cancellation system of claim 4, in which the bias coefficient generator is further responsive to a Fast Walsh Transform parameter that indicates the quadriphase rotation.

10. The Fast Walsh Transform bias cancellation system of claim 9, further including the Fast Walsh Transform system.

11. A Fast Walsh Transform bias cancellation system, comprising:
   a bias coefficient generator responsive to feedback filter coefficients, said bias coefficient generator having a plurality of outputs and configured to calculate bias generator inputs; and
   a bias generator responsive to the bias coefficient generator outputs and having a plurality of outputs, the signals on said bias generator outputs corresponding to the bias from the Fast Walsh Transform system, said bias generator including:
      a first set of complex multipliers, one coupled to each bias generator input and responsive thereto, each of said first set of complex multipliers having a complex output;
      a plurality of adders each having an output and responsive to the complex outputs of the first set of complex multipliers; and
      a second set of complex multipliers, one coupled to each adder output and responsive thereto, and having outputs for providing said bias generator outputs.

12. The Fast Walsh Transform bias cancellation system of claim 11, in which the bias coefficient generator has three outputs each having a signal thereon, the generator output signals being defined by the respective equations:

$$D_0 = -f_1 \Phi_2 + f_3 \Phi^*_2$$

$$D_1 = 2f_3 \Phi_2 + 2f_5 \Phi^*_2$$

$$D_2 = -f_5 \Phi_2 + f_7 \Phi^*_2.$$

13. The Fast Walsh Transform bias cancellation system of claim 12, in which the outputs of the bias generator has sixteen outputs each having a signal thereon, the bias generator output signals being defined by the equation:

$$B_k = D_0 a_{0,\lfloor k/4 \rfloor} b^*_{\lfloor k/4 \rfloor, k} + D_1 b^*_{\lfloor k/4 \rfloor, k} + D_2 a^*_{0,\lfloor k/4 \rfloor} b^*_{\lfloor k/4 \rfloor, k}.$$

14. The Fast Walsh Transform bias cancellation system of claim 11, in which the first set of complex multipliers includes three complex multipliers, the plurality of adders includes eight adders, the second set of complex multipliers includes sixteen complex multipliers and the bias generator includes sixteen outputs.

15. The Fast Walsh Transform bias cancellation system of claim 11, in which the bias coefficient generator is responsive to the feedback filter coefficients consisting of $f_1$, $f_3$, $f_5$, and $f_7$.

16. The Fast Walsh Transform bias cancellation system of claim 11, in which the bias coefficient generator is further responsive to a Fast Walsh Transform parameter selected from the group of $\varnothing_2$ selected from the group of 1, −1, j and −j.

17. The Fast Walsh Transform bias cancellation system of claim 11, further including the Fast Walsh Transform system.

18. A Fast Walsh Transform bias cancellation system, comprising:
   a Fast Walsh Transform system having a plurality of outputs;
      means for generating the bias of the Fast Walsh Transform system;
      means for cancelling the bias from said Fast Walsh Transform system responsive to said Fast Walsh Transform system outputs and said means for generating the bias of the Fast Walsh Transform system.

19. A method for cancelling the bias from a Fast Walsh Transform system, the method comprising the steps of:
   generating the bias from a Fast Walsh Transform system responsive only to feedback filter coefficients $f_1$, $f_3$, $f_5$ and $f_7$; and
   cancelling the bias of said Fast Walsh Transform system using the generated bias of the Fast Walsh Transform system.

* * * * *